(12) United States Patent
Tamura

(10) Patent No.: US 7,094,342 B2
(45) Date of Patent: Aug. 22, 2006

(54) WATER ACTIVATION DEVICE

(76) Inventor: Kikuo Tamura, 24-1, Azahagioka, Ishimushiro, Atami-machi, Koriyama-shi, Fukushima (JP)

( * ) Notice: Subject to any disclaimer, the term of this patent is extended or adjusted under 35 U.S.C. 154(b) by 330 days.

(21) Appl. No.: 10/628,015

(22) Filed: Jul. 25, 2003

(65) Prior Publication Data

US 2004/0026307 A1    Feb. 12, 2004

(30) Foreign Application Priority Data

Aug. 9, 2002  (JP)  ............... 2002-233587

(51) Int. Cl.
*C02F 1/68* (2006.01)
(52) U.S. Cl. ............ 210/199; 210/198.1; 210/205; 210/243; 210/284; 210/291; 210/748
(58) Field of Classification Search ............ 210/198.1, 210/243
See application file for complete search history.

(56) References Cited

U.S. PATENT DOCUMENTS

| | | | |
|---|---|---|---|
| 4,501,661 A * | 2/1985 | Karasawa | 210/223 |
| 5,149,428 A * | 9/1992 | Morimoto | 210/283 |
| 5,211,851 A | 5/1993 | Meurer | |
| 5,211,973 A | 5/1993 | Nohren, Jr. | |
| 5,674,391 A | 10/1997 | Nohren, Jr. | |
| 5,776,346 A * | 7/1998 | Fukai | 210/663 |
| 6,103,111 A * | 8/2000 | Kakamu et al. | 210/167 |
| 6,241,893 B1 | 6/2001 | Levy | |
| 6,475,386 B1 | 11/2002 | Carr et al. | |

FOREIGN PATENT DOCUMENTS

| | | | |
|---|---|---|---|
| JP | 05-285471 | | 11/1993 |
| JP | 06-343968 | | 12/1994 |
| JP | 07-024470 | | 1/1995 |
| JP | 409053896 A | * | 2/1997 |
| JP | 11-005082 | | 1/1999 |
| JP | 4110417737 A | * | 2/1999 |

* cited by examiner

*Primary Examiner*—Peter A. Hruskoci
(74) *Attorney, Agent, or Firm*—Muramatsu & Associates

(57) ABSTRACT

A water activation device efficiently activates water and maintains its activation performance over a long period of time. The water activation device includes a conductive body having an in-flow opening and an out-flow opening, a cover member that coats the outer perimeter of the body through insulation material and is insulated from water pipes, a plurality of holders overlapped with one another in an axial direction of the body, and a plurality of activation material units each being formed in a cylindrical block containing minerals as a main component. The activation material units are held in a retainer of the holder without contacting with one another. Each of the holders is formed of a retainer having a plurality of flow openings.

6 Claims, 8 Drawing Sheets

WATER ACTIVATION DEVICE

FIELD OF THE INVENTION

This invention relates to a water activation device for activating water by directly connecting to water pipes.

BACKGROUND OF THE INVENTION

In the natural world, rain and snow accumulated in the mountains permeate the ground and become groundwater. After a while, the groundwater becomes spring water and forms the headstream of a river. During this process, the water becomes reduced either by the subdivision of the hydrogen bond group (cluster) of water molecules caused by infrared rays, negative ion actions, or magnetic actions of minerals and rocks, or by receiving the electrons generated by the friction between water molecules created from collision against the rocks or waterfall. The water in such condition is called activated water, and various effects of the activated condition are gradually lost since the activated condition cannot be maintained for a long period of time.

Therefore, a water activation device has been developed by applying the principle of this activation process, where the water losing its activation effect is reactivated by water flow friction which is caused by flowing and stirring the city water through ceramic baked particles placed in the internal space.

However, the limited length of the water passage in the conventional activation process gives rise to problems such as insufficiency in activation effect and fails in subdividing the water molecules and lowering a voltage of oxidation-reduction. Also, in the activation device having a structure that the ceramic baking particles are mixed together and collide against each other by the water flow, the water flow often becomes sluggish because the particles are unevenly distributed, which results in losing the water pressure. Moreover, the wearing-out of the ceramic baking particles over a long period of time reduces the amount of the ceramic baking particles and causes problems such as losing the activation effect and requiring maintenance works for replacing the ceramic baking particles.

As described in the foregoing, there is a need for a water activation device that can overcome the drawbacks of the conventional technology.

SUMMARY OF THE INVENTION

It is, therefore, an object of the present invention to provide a water activation device that can efficiently activates the water that has lost the activation effect and maintain its activation effect over a long period of time.

It is another object of the present invention to provide a structure of water activation device which is capable of easily replacing the activation materials.

In order to achieve the above object, in the first aspect of the present invention, the water activation device is comprised of: a body which is made of conductive material and has an in-flow opening and an out-flow opening; a cover member which is made of conductive material and covers an outer surface of the body through insulation material therebetween and is insulated from water pipes; a plurality of holders overlapped with one another in an axial direction of the body, each of the holders being formed of a retainer having a plurality of flow openings; and a plurality of activation material units each being formed in a cylindrical lump containing minerals as a main component. The plural activation material units are placed in an overlapping manner without contacting with one another along a direction of a water flow in an internal space of the body.

In the second aspect of the water activation device of the present invention, one or more of the activation material units are removably held in a holder without contacting with one another, and wherein one or more of the holders are removably provided in the body.

In the third aspect of the water activation device of the present invention, the in-flow opening and the out-flow opening are formed in a pipe-like manner along a straight or curved center line of the body.

In the fourth aspect of the water activation device of the present invention, a plurality of flow openings are formed on a retainer of the holder that holds the activation material units, and wherein an outer perimeter of the retainer is substantially fitted with an inner surface of the internal space of the body.

In the fifth aspect of the water activation device of the present invention, the plurality of holders are placed and connected with each other in an overlapping manner along a straight and curved center line of the body.

In the sixth aspect of the water activation device of the present invention, the plurality of flow openings formed on the retainer of the holder are comprised of: turning slope surfaces for generating deflected flows of water in a turning direction; inner slope surfaces for generating deflected flows of water in an inner radial direction; and outer slope surfaces for generating deflected flows of water in an outer radial direction.

The water activation device of the present invention based on the above structure is applied as follows. First, the water coming from the in-flow opening impinges on the activation material units held by the retainer of the holder, passes through the activation material units, and reaches the retainer. The activation material units or the holders will not be worn out because the activation material units are placed so as not to contact with one another, and are firmly held on the retainers with the pressure of the water flow. As a result, the ability of subdividing the hydrogen bond groups (clusters) of water molecules based on infrared rays from activation material units can be maintained in the internal space of the body over a long period of time. Furthermore, since the electrical insulation between the internal space of the body and the cover member functions as an electric double layer capacitor, the electrons generated in the internal space will not attract any positive charge from the outside of the body, thus, suppressing any damage in the activation process and preventing any electric corrosion on the water activation device.

Based on the water flowing to the water activation device, the hydrogen bond groups (clusters) of water molecules are subdivided by the infrared rays from the activation materials, and the electrons are generated from the friction of the water molecules to create reduced water within the internal space of the body. In other words, the water flows out from the out-flow opening has been converted to activated water. Also, by adjusting the number of holders that are placed in multiple layers, the degree of activation can be adjusted. Further, by placing the in-flow opening and out-flow opening along the same straight or curved line, pressure loss during the water flow can be prevented.

In addition, by fitting the outer perimeter (outer rim) of the holder into the inner surface of the internal space, all of the flowing water will pass through the flow openings established on the retainer of the holder and collide against the activation material units, thereby amplifying the activation process. Moreover, when the water flows through the turning slope surfaces, inner slope surfaces, and outer slope surfaces established on the retainer, turbulent flows are generated from the turning flows, inner deflected flows, and outer deflected flows, exerting stirring effects as well as amplifying a charge generation activity.

DETAILED DESCRIPTION OF THE INVENTION

Figure 1:
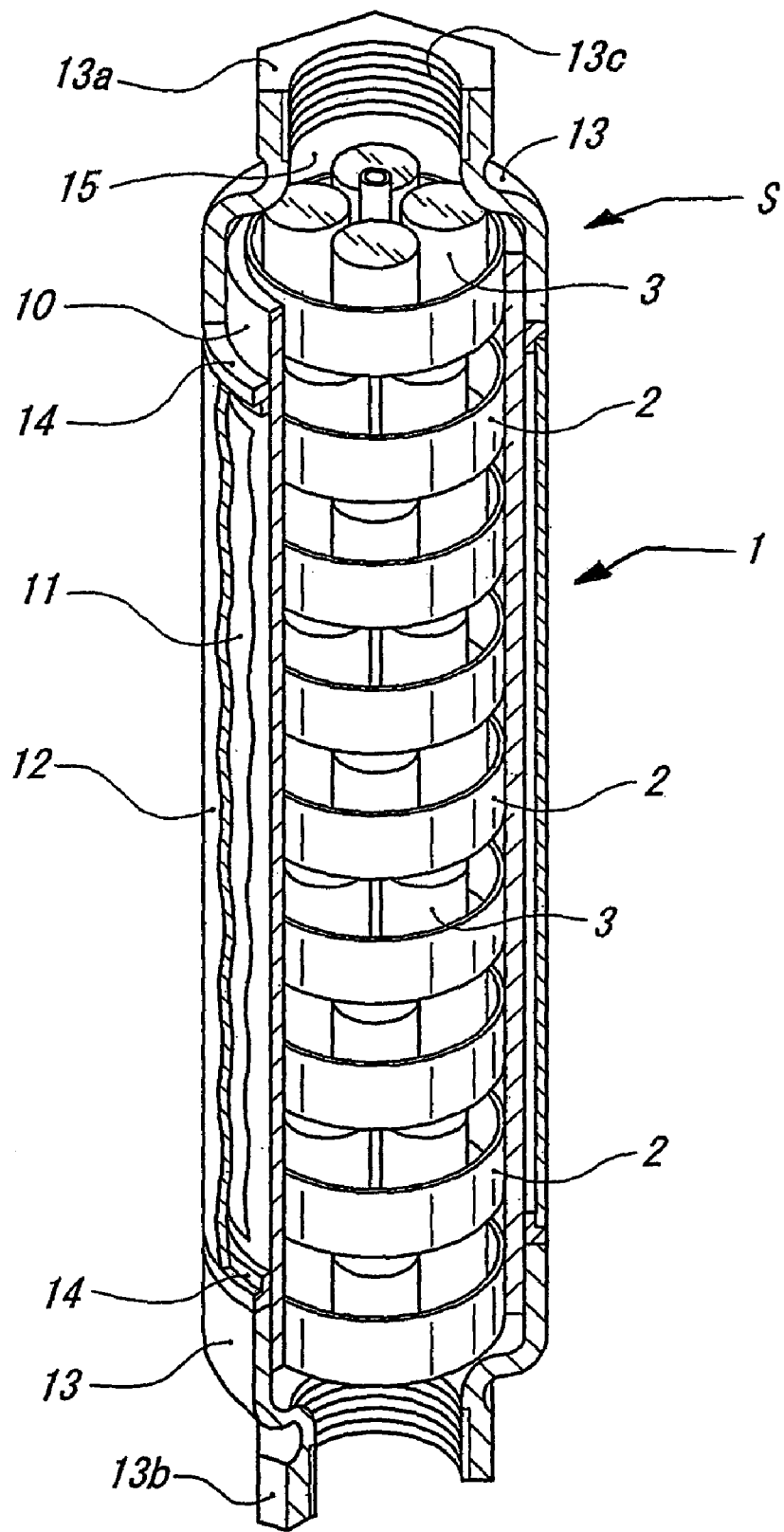
FIG. 1 is a perspective view including a partial cross section of an example of a water activation device of the present invention.
Figure 3:
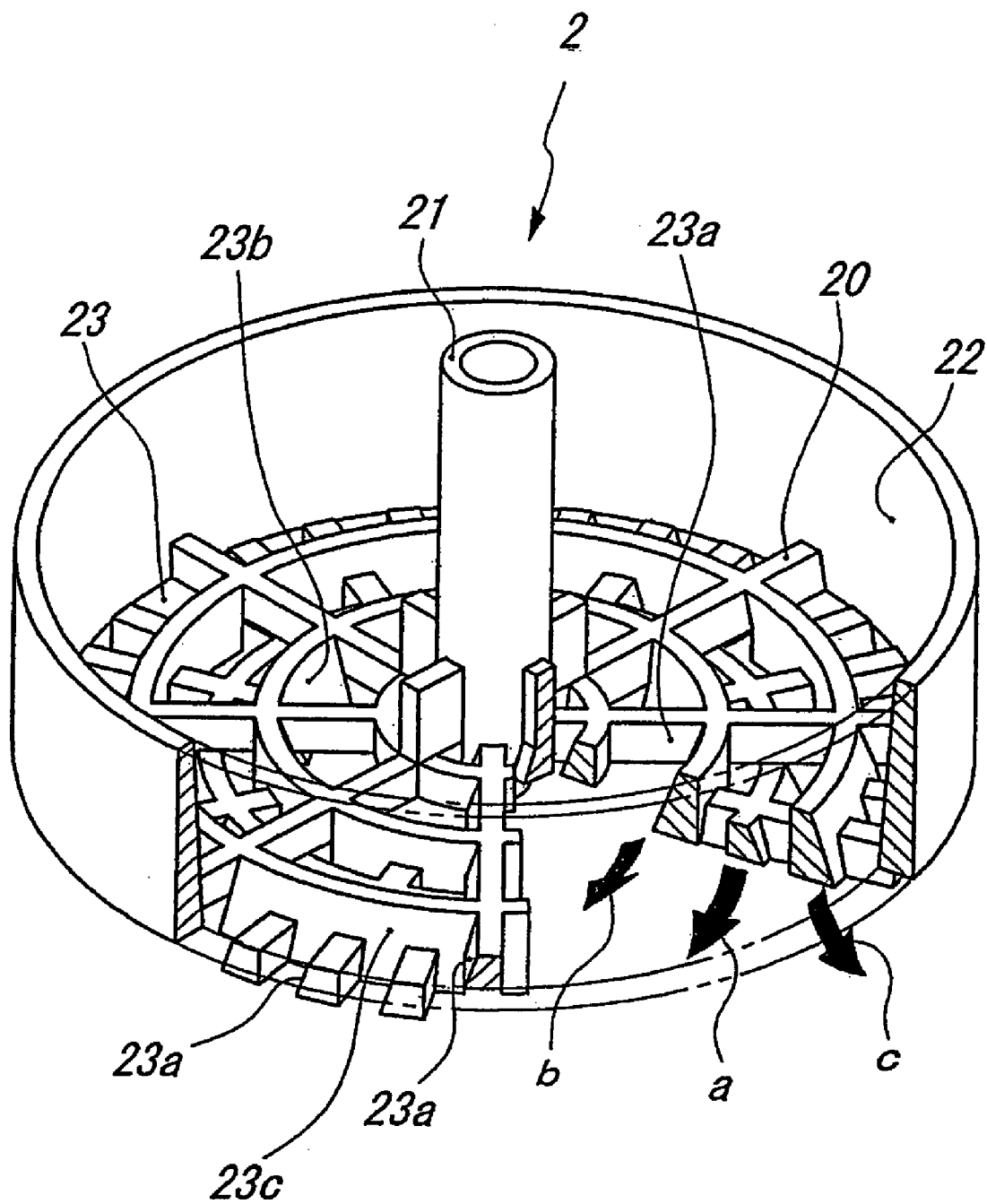
FIG. 3 shows an outside view of the holder used in the water activation device of in the present invention including a partial cross sectional view.
Figure 4:
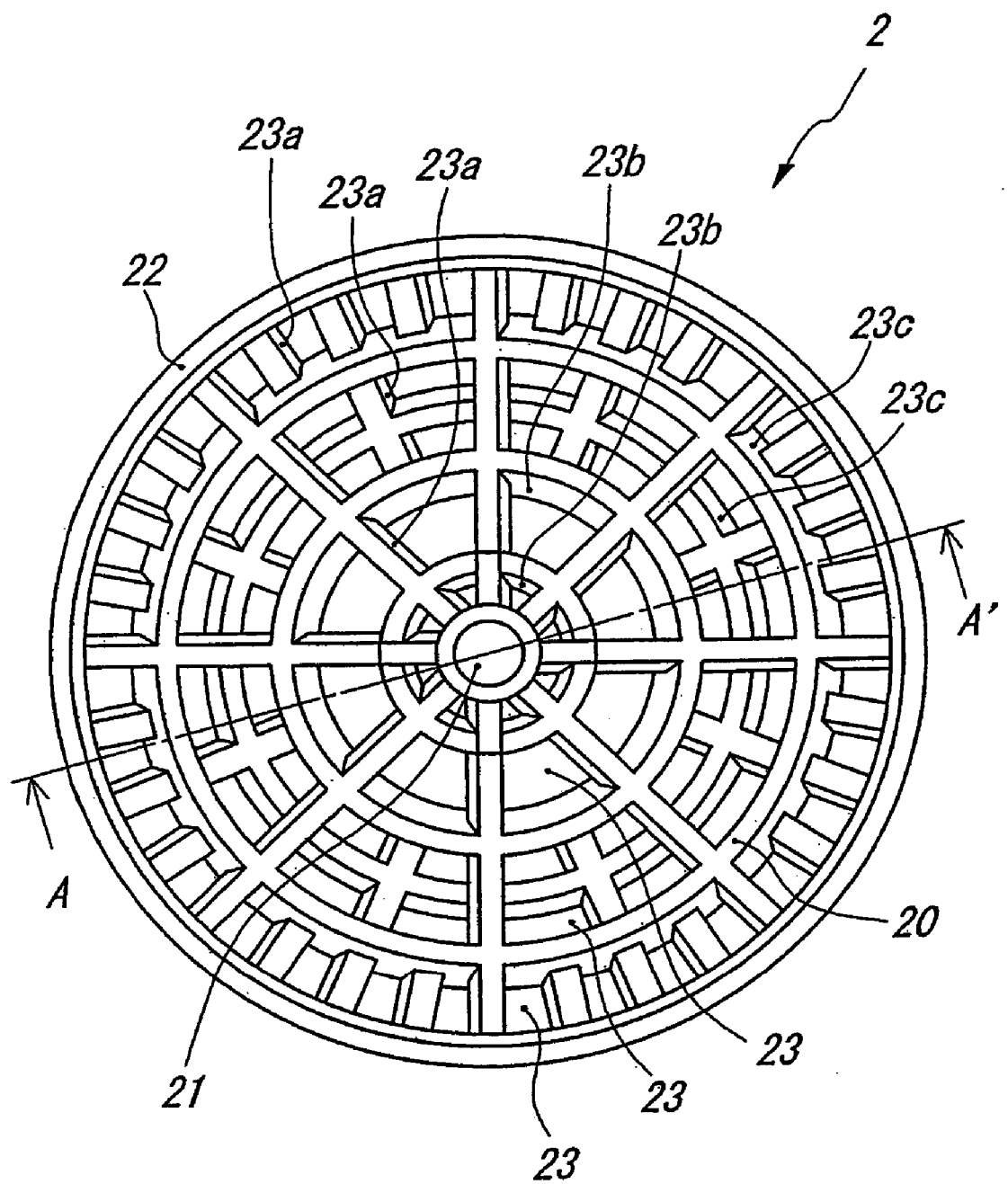
FIG. 4 is a plan view of the holder used in the water activation device of the present invention.
Figure 5:
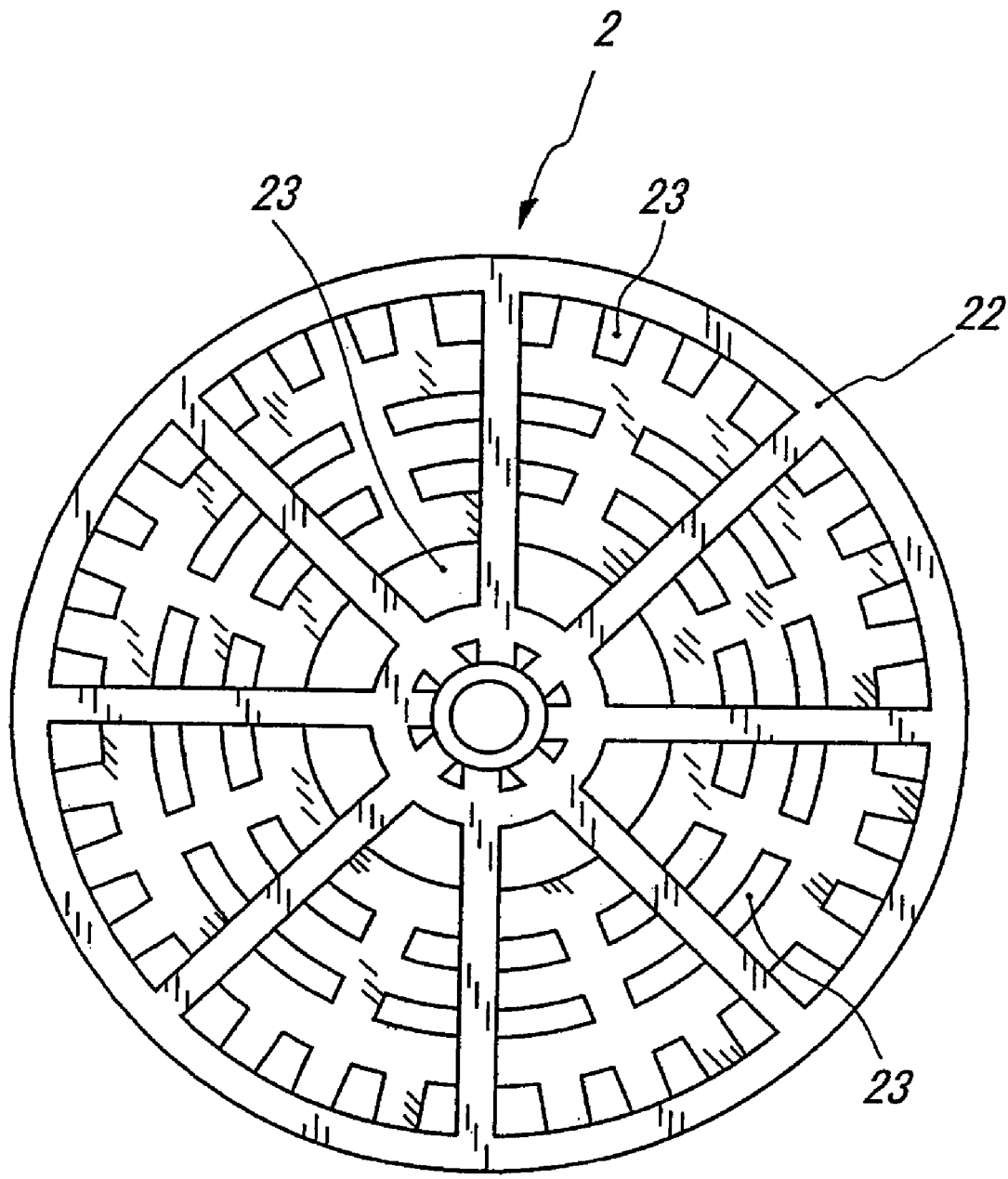
FIG. 5 is a bottom view of the holder used in the water activation device of the present invention.
Figure 6:
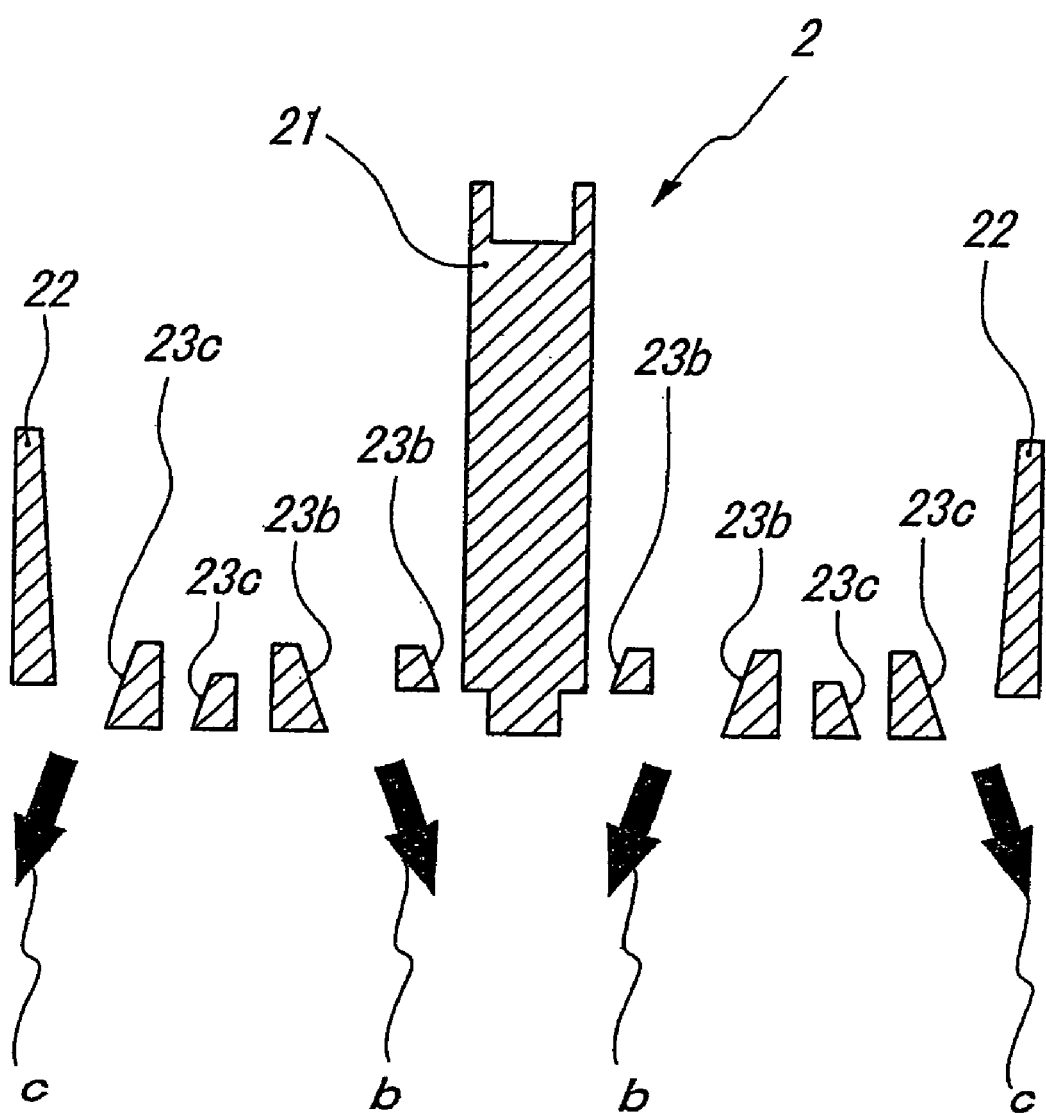
FIG. 6 is a cross sectional view of the holder used in the water activation device of the present invention taken along the A—A line of FIG. 4.

Preferred embodiments of the present invention will be described with reference to the accompanying drawings. FIG. 1 is a perspective view including a partial cross section of an example of a water activation device of the present invention, FIG. 2 is a cross sectional view of the water activation device, FIG. 3 shows an outside view of the holder used in the water activation device including a partial cross sectional view, FIG. 4 is a plan view of the holder used in the water activation device of the present invention, FIG. 5 is a bottom view of the holder, FIG. 6 is a cross sectional view of the holder taken along the A—A line of FIG. 4.

The water activation device S is mainly comprised of a body 1, holders 2, and activation material unit 3. The body 1 is composed of a main body 10 having a cylindrical metal tube of a predetermined length, insulation material 11 which is electrical insulation material and covers almost all of the outer surface of the main body 10, and a conductive cover member 12 having a tubular shape which covers the insulation material 11 on the main body 10. Further, connecting tubes 13 for serially connecting to a water flow passage are spirally connected to both ends of the main body 10 in a watertight manner to cover the openings.

In assembling the connecting tubes 13, electrical insulation rings 14 (FIG. 1) are provided between the ends of the cover member 12 and the connecting tubes 13, thereby electrically insulating therebetween. Inner screws 13c for screw connecting to water pipes 4 (FIG. 2) in a watertight manner are provided on an inner surface at open ends of the connecting tubes 13 attached to the main body. One of the connecting tubes 13 works as an in-flow opening 13a and the other works as an out-flow opening 13b.

Figure 2:
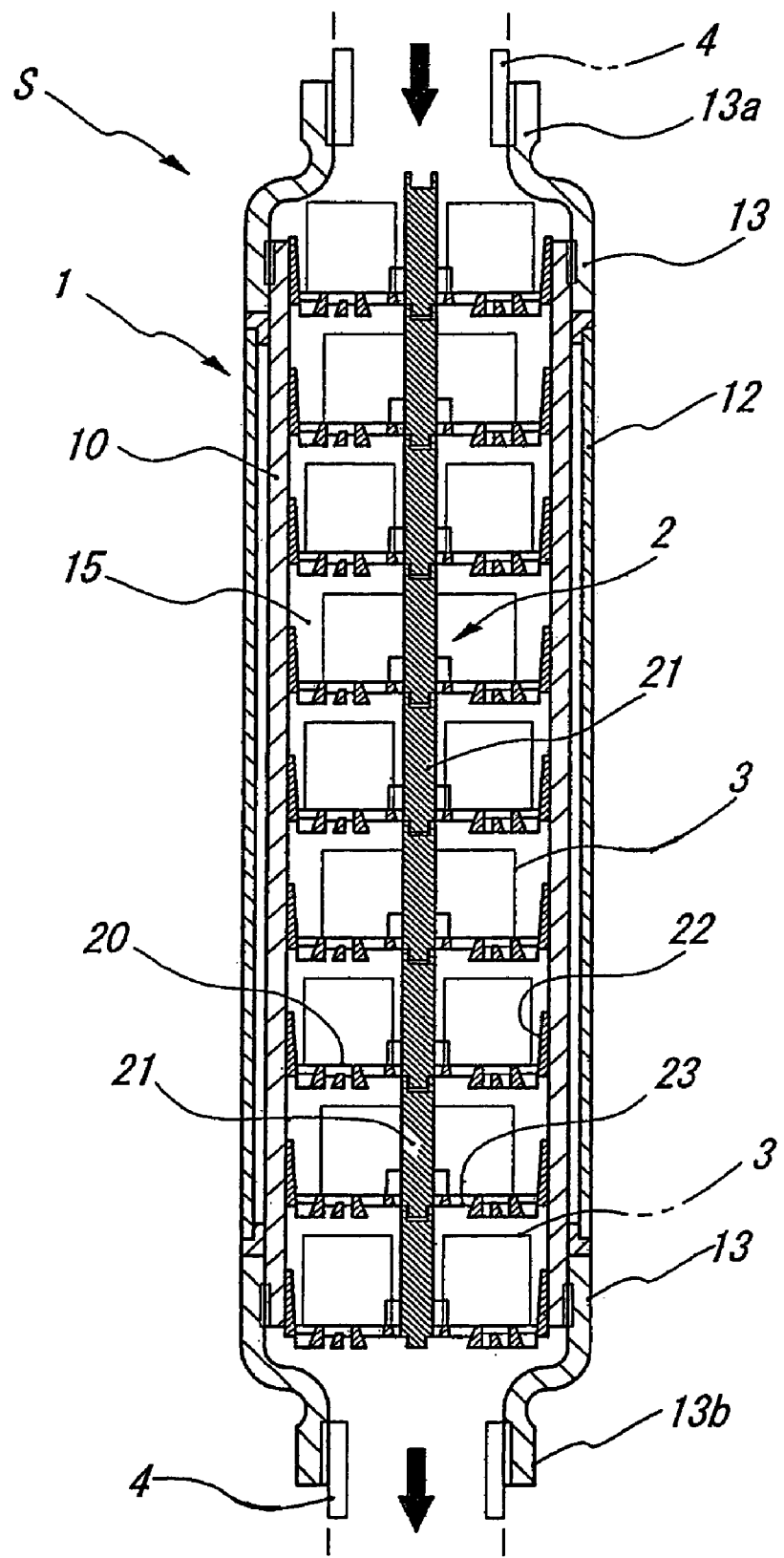
FIG. 2 is a cross sectional view of the water activation device of the present invention.

One or more holders 2 made through resin molding processes are provided in a cylindrical internal space 15 of the body 1 as shown in FIGS. 1 and 2. The holder 2 is integrally formed of a disc-like retainer 20 having multiple flow openings 23 shaped in a net-like manner, a connecting column 21 that is vertically installed in the center of the retainer 20 and has a predetermined height, and a cylindrical side wall 22 that is shorter than the height of the connecting column 21 and surrounds an outer edge of the retainer 20, as shown in FIGS. 3 and 4.

In the retainer 20 of the holder 2 structured as mentioned above, one or more activation material units 3 explained hereafter are placed around the connecting column 21. Further, the plurality of such holders 2 are coaxially placed along the internal space 15 of the body 1 so that each connecting column 21 is joined in a coaxial manner. The activation material units 3 are preferably placed over the retainer 20 without contacting with one another so that the water will evenly flow over the surfaces of the activation material units 3. Further, the activation material units 3 located between adjoining holders (ex. upper holder and lower holder) 2 are preferably placed such that two positions on the adjoining holders 2 with respect to a center of the column 21 should have a proper angle each other. In this example, the activation material units 3 provided on the holders 2 are separated by 90° from one another with respect to the column 21. The activation material units 3 in the upper or lower holder 2 are positioned by 45° different from those of the center holder 2, which is a half of the spacing angle (90°) between the activation materials on the same holder 2.

Moreover, various slope surfaces are formed in the flow openings 23 of the holder 2 as shown in FIGS. 3–6. In order to generate turbulent flows by the deflection of the water flowing through the retainer 20, in the flow openings 23, a plurality of slope surfaces 23a which are radially formed are tilted (at the side of the out-flow opening 13b) towards the turning direction. In addition, at the side of the out-flow opening 13b, a plurality of inner slope surfaces 23b near the inner side of the flow opening 23 are tilted towards an inner direction, and a plurality of outer slope surfaces 23c near the outer side of the flow opening 23 are tilted towards an outer direction in a concentric circle-like manner.

The activation material unit 3 held by the holder 2 as described above is a cylindrical pellet-like baked member containing multi-element minerals as a main component. The activation material unit 3 in this example is approximately as tall as the connecting column 21 (FIGS. 1 and 2), and has a diameter of about half that of the holder 2. Each bottom part of the activation material unit 3 is attached to the retainer 20 of the holder 2 such that the four activation material units 3 are respectively placed by 90° apart from the other.

In this example, ground (earth) connection is not necessary since the water activation device S is buried underground. However, if the water activation device S is installed above the ground, the cover member 12 should be preferably grounded.

Operations in the water activation device S of the present invention based on the above structure are as follows. First, the water coming from the in-flow opening 13a impinges on the activation material units 3 held by the retainer 20 of the holder 2, passes through the activation material units 3, and reaches the retainer 20. The activation material units 3 or the adjoining holders 2 will not be worn out from the contact because the activation material units 3 are placed so that they do not contact with one another, and are firmly held on the retainers 20 with the pressure of the water flow. As a result, the ability of subdividing the hydrogen bond groups (clusters) of water molecules based on infrared rays from activation material units 3 can be maintained in the internal space 15 of the body 1 over a long period of time.

Moreover, various turbulent flows such as the turning flow a, the inner deflected flow b, and the outer deflected flow c are generated such as shown in FIGS. 3 and 6 when the water flows through the turning slope surfaces 23a, inner slope surfaces 23b, and outer slope surfaces 23c provided on the retainer 20, where the friction and collision of the water molecules generate electrons to create reduced water, which flows out as activated water from the out-flow opening 13b (FIGS. 1 and 2).

Figure 7:
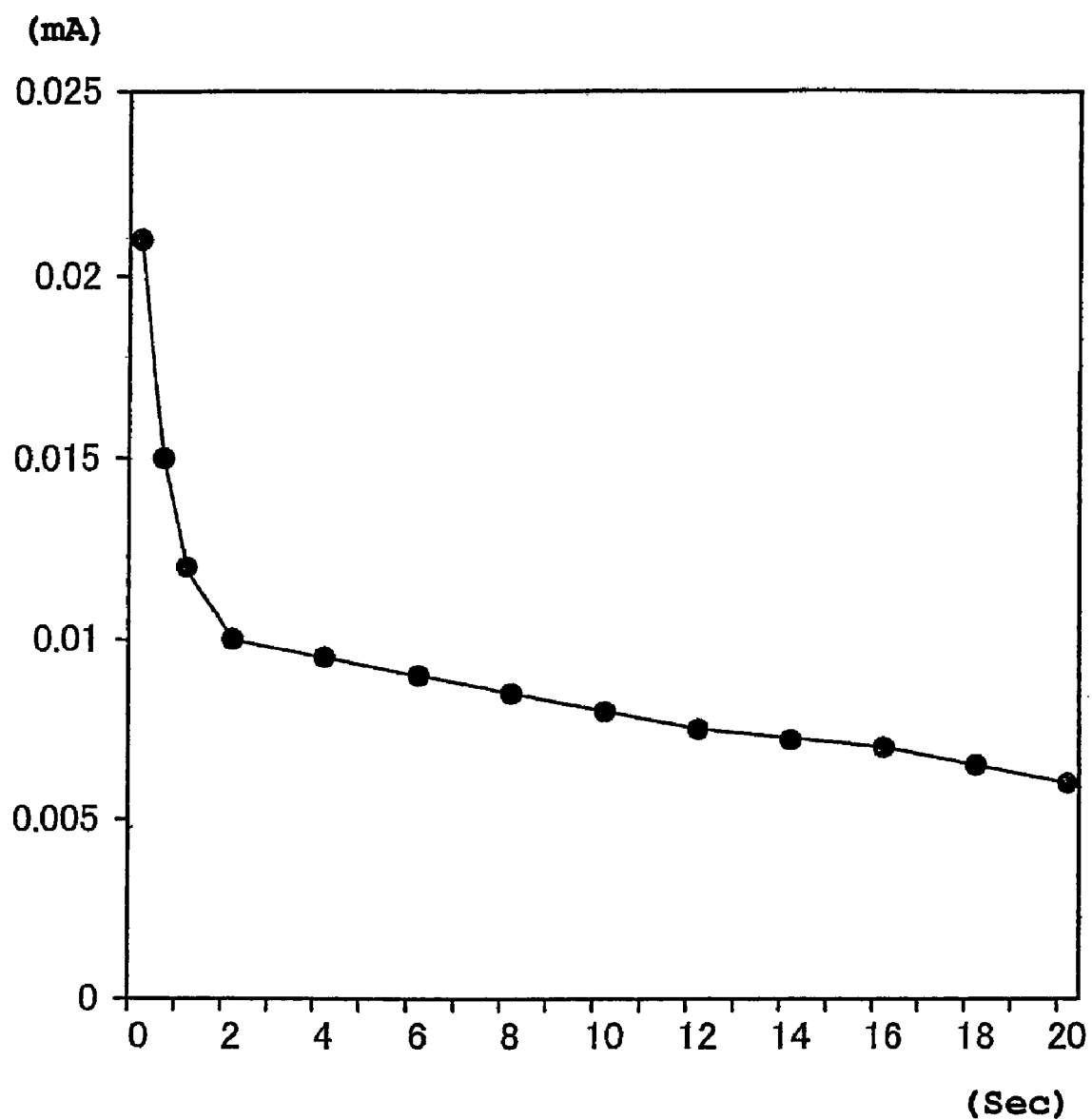
FIG. 7 is a graph showing the measurement result of the discharge characteristics of the water activation device of the present invention.

The function of an electric double layer capacitor formed by the body 1 and the cover member 12 was evaluated. The measured value of internal resistance between the body 1 and cover member 12 is 600kΩ. When charging it by a DC (Direct Current) voltage source of 15 volts for three seconds, a voltage of 0.03 V and a current of 0.02 mA between the body 1 and the cover member 12 were observed. As shown in the measurement result of the discharge characteristics of FIG. 7, it is known that the electrical insulation between the internal space 15 of the body 1 and the cover member 12 functions as an electric double layer capacitor. Consequently, the electrons generated in the internal space 15 will not attract positive charges from the outside of the body 1, thus not adversely affect the activation process. This is also effective in preventing the electrical corrosion on the water activation device S.

Figure 8:
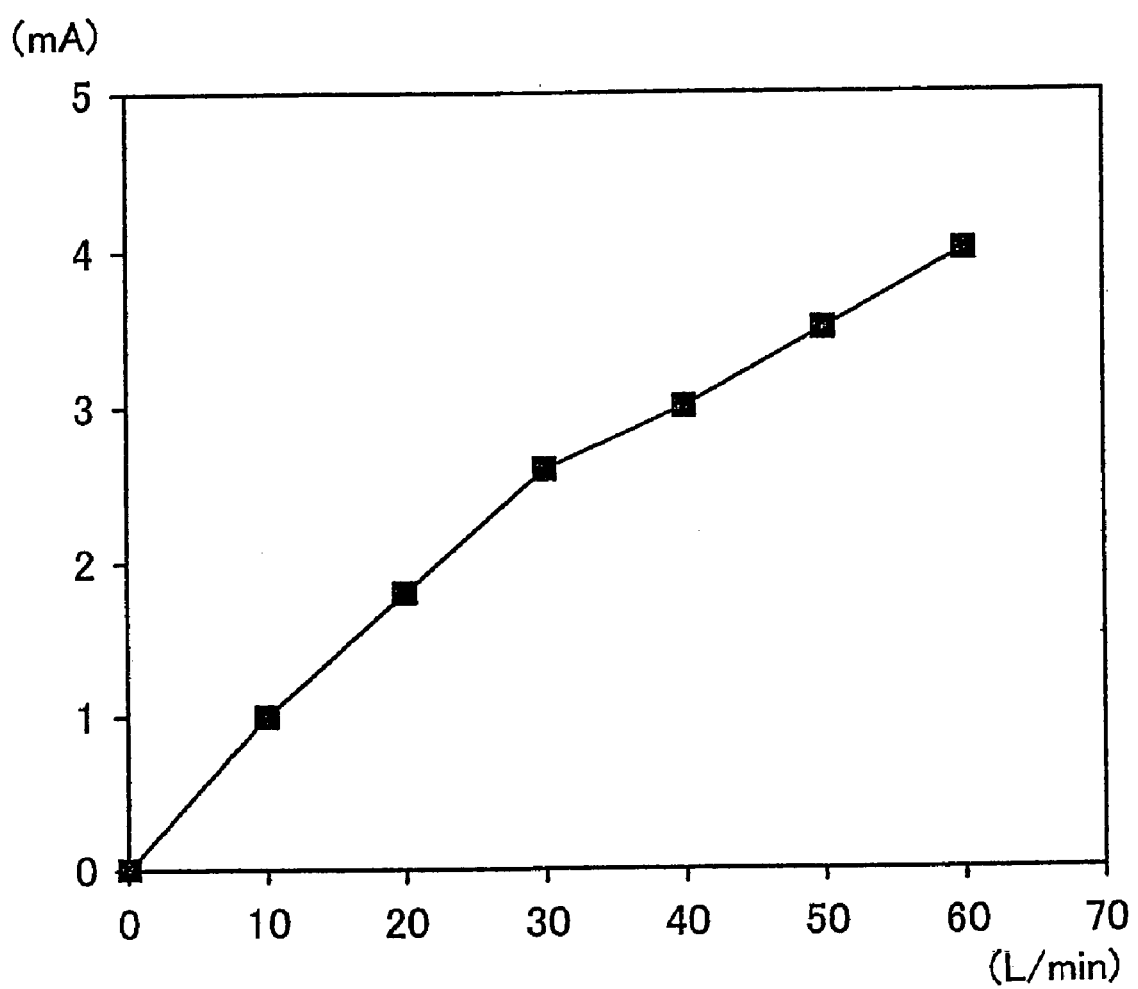
FIG. 8 is a graph showing the measurement result of the electric charge characteristics relative to the amount of water flowing through the water activation device of the present invention.

FIG. 8 shows a measurement result of the electric charge characteristics relative to the amount of water flowing through the water activation device S. It should be noted that a large amount of electric charge is generated within the amount of ordinary city water. The number of the holders 2 as well as the size and shape of the activation material units 3 can be modified because the length of the internal space 15 of the water activation device S is also optional. Further, the positions and the number of the activation material units 3 per every holder 2 can be appropriately changed.

Further, in the above embodiment, the water pipe 4 and body 1 are coaxially connected. However, the water activation device of the present invention is not limited to such a particular configuration. For example, although not shown, a storage tank with a properly watertight form such as a cylinder, calyx, or rectangular box can be established with an in-flow opening and an out-flow opening to connect the water activation device of the present invention so that the water to be treated can flow through. The inside of the storage tank can be smoothly structured and several holders can be placed in a stream line manner.

As has been described, according to the water activation device of the present invention, the hydrogen bond groups (clusters) of water molecules can be subdivided by infrared rays coming from the activation material held in the holder of the internal space of the body. Further, the water can be efficiently activated, resulting in remarkable effects since reduced water is produced by the electrons which are generated from the friction and collision of the water molecules caused by various turbulent flows created by the water flowing through the retainer of the holder.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A water activation device, comprising:
   a body which is made of conductive material and has an in-flow opening and an out-flow opening;
   a cover member which is made of conductive material and covers an outer surface of the body through insulation material therebetween and is insulated from water pipes;
   a plurality of holders overlapped with one another in an axial direction of the body, each of the holders being formed of a retainer having a plurality of flow openings; and
   a plurality of activation material units each having a cylindrical shape and containing minerals as a main component;
   wherein two or more activation material units are placed in the retainer of each holder without contacting with one another so that the plurality of activation material units are overlapped through the holders in the axial direction of the body; and
   wherein the plurality of flow openings have slope surfaces tilted toward inner and outer directions, thereby producing turbulent flows of the water when the water flows through the flow openings.

2. A water activation device as defined in claim 1, wherein the two or more activation material units are removably held in each of the holders without contacting with one another where the activation material units in one holder are positioned at different angles about an axis of the body from that of the activation material units in the immediately next holder, and wherein one or more of the holders are removably provided in the body.

3. A water activation device as defined in claim 1, wherein the in-flow opening and the out-flow opening are formed in a pipe-like manner along a straight or curved center line of the body.

4. A water activation device as defined in claim 1, wherein the plurality of flow openings are formed on a retainer of the holder that holds the activation material units, and wherein an outer perimeter of said retainer is substantially fitted with an inner surface of the internal space of the body.

5. A water activation device as defined in claim 4, wherein the slope surfaces of the plurality of flow openings formed on the retainer of the holder for producing the turbulent flows of the water, comprising:
   turning slope surfaces for generating deflected flows of water in a turning direction;
   inner slope surfaces for generating deflected flows of water in an inner radial direction; and
   outer slope surfaces for generating deflected flows of water in an outer radial direction.

6. A water activation device as defined in claim 1, wherein the plurality of holders are placed and connected with each other in an overlapping manner along a straight and curved center line of the body.

* * * * *